US012589994B2

(12) United States Patent
Tewari et al.

(10) Patent No.: US 12,589,994 B2
(45) Date of Patent: Mar. 31, 2026

(54) ENHANCED HYDROGEN RECOVERY UTILIZING GAS SEPARATION MEMBRANES INTEGRATED WITH PRESSURE SWING ADSORPTION UNIT AND/OR CRYOGENIC SEPARATION SYSTEM

(71) Applicant: LUMMUS TECHNOLOGY LLC, Houston, TX (US)

(72) Inventors: Shekhar Tewari, Houston, TX (US); Ronald M. Venner, Houston, TX (US); Sunil Panditrao, Houston, TX (US); Dennis Maloney, Houston, TX (US)

(73) Assignee: Lummus Technology LLC, Houston, TX (US)

( * ) Notice: Subject to any disclaimer, the term of this patent is extended or adjusted under 35 U.S.C. 154(b) by 510 days.

(21) Appl. No.: 17/647,438

(22) Filed: Jan. 7, 2022

(65) Prior Publication Data

US 2022/0219978 A1     Jul. 14, 2022

Related U.S. Application Data

(60) Provisional application No. 63/135,432, filed on Jan. 8, 2021.

(51) Int. Cl.
*C01B 3/50* (2006.01)
*B01D 53/047* (2006.01)
(Continued)

(52) U.S. Cl.
CPC ............ *C01B 3/501* (2013.01); *B01D 53/047* (2013.01); *B01D 53/229* (2013.01); *C01B 3/508* (2013.01);
(Continued)

(58) Field of Classification Search
CPC ... C01B 3/501; C01B 3/508; C01B 2203/046; C01B 2203/142; C01B 3/56;
(Continued)

(56) References Cited

U.S. PATENT DOCUMENTS 6,589,303 B1     7/2003  Lokhandwala et al.
2003/0024388 A1  2/2003  Scharpf
(Continued)

FOREIGN PATENT DOCUMENTS

CN        205607020 U  *  9/2016   ............. Y02P 30/40
EP        2432732 B1     12/2017
WO        WO 2016069403 A2 *  5/2016   ............... C10L 3/12

OTHER PUBLICATIONS

CN 205607020 U Translation (Year: 2016).*
(Continued)

*Primary Examiner* — Jerry-Daryl Fletcher
*Assistant Examiner* — Dario Antonio Deleon
(74) *Attorney, Agent, or Firm* — Osha Bergman Watanabe & Burton LLP

(57)     ABSTRACT

Processes and systems for recovering hydrogen include feeding a gas stream, comprising hydrogen and additional gases, to a pressure swing adsorption (PSA) system and feeding a membrane permeate stream comprising hydrogen to the PSA system. In the PSA system, a portion of the hydrogen is separated from the additional gases to recover a hydrogen product stream and a PSA tail gas stream comprising unseparated hydrogen and the additional gases. The PSA tail gas stream is fed to a membrane separation unit for separating hydrogen from the additional gases and to recover (i) the membrane permeate stream comprising hydrogen fed to the PSA system and (ii) a membrane tail gas stream comprising the additional gases. Processes and systems herein may additionally include a refrigeration system (Continued)

for partially condensing one or both of the feed gas stream and the PSA tail gas stream, enhancing the efficiency of the membrane separation unit.

16 Claims, 3 Drawing Sheets

(51) Int. Cl.
| | |
|---|---|
| *B01D 53/22* | (2006.01) |
| *C01B 3/501* | (2026.01) |
| *C01B 3/508* | (2026.01) |
| *F25J 3/02* | (2006.01) |

(52) U.S. Cl.
CPC ......... *F25J 3/0252* (2013.01); *B01D 2256/16* (2013.01); *B01D 2311/04* (2013.01); *B01D 2311/106* (2013.01); *B01D 2311/14* (2013.01); *B01D 2311/2512* (2022.08); *B01D 2311/2626* (2013.01); *C01B 2203/046* (2013.01); *F25J 2205/40* (2013.01); *F25J 2205/64* (2013.01); *F25J 2205/80* (2013.01)

(58) Field of Classification Search
CPC  B01D 53/047; B01D 53/229; B01D 2256/16; B01D 2311/04; B01D 2311/106; B01D 2311/14; B01D 2311/2512; B01D 2311/2626; B01D 2257/702; B01D 53/002; B01D 2257/7025; B01D 2311/25; F25J 3/0252; F25J 2205/40; F25J 2205/64; F25J 2205/80; F25J 3/0625; F25J 3/0655; F25J 3/067; F25J 2210/12; F25J 2245/02; F25J 2270/60; F25J 3/062; F25J 3/0635
See application file for complete search history.

(56) References Cited

U.S. PATENT DOCUMENTS

| | | | |
|---|---|---|---|
| 2010/0129284 A1* | 5/2010 | Niitsuma et al. ....... | C01B 3/382 |
| | | | 423/437.1 |
| 2012/0141367 A1 | 6/2012 | Wynn et al. | |
| 2012/0291483 A1 | 11/2012 | Terrien et al. | |
| 2012/0304688 A1* | 12/2012 | Dragomir et al. ....... | F25J 3/062 |
| | | | 62/617 |
| 2014/0058002 A1 | 2/2014 | Early | |
| 2015/0323248 A1* | 11/2015 | Terrien et al. ......... | F25J 3/0223 |
| | | | 252/373 |
| 2016/0115029 A1* | 4/2016 | Vercammen et al. ...................... | |
| | | | B01D 53/229 |
| | | | 423/262 |
| 2018/0111831 A1 | 4/2018 | Adamopoulos | |
| 2020/0088466 A1* | 3/2020 | White et al. ......... | B01D 53/227 |

OTHER PUBLICATIONS

WO 2016069403 A2 Translation (Year: 2016).*
International Search Report issued in International Application No. PCT/US2022/011662 dated Apr. 29, 2022 (4 pages).
Written Opinion issued in International Application No. PCT/US2022/011662 dated Apr. 29, 2022 (6 pages).
Extended European Search Report issued in Application No. 22737192.9 mailed on Dec. 16, 2024 (8 pages).
Extended European Search Report issued in Application No. 22737192.9 mailed on Feb. 16, 2024 (8 pages).
Office Action issued in corresponding IL Application No. 304271 dated Dec. 23, 2025 (4 pages).

\* cited by examiner

ENHANCED HYDROGEN RECOVERY UTILIZING GAS SEPARATION MEMBRANES INTEGRATED WITH PRESSURE SWING ADSORPTION UNIT AND/OR CRYOGENIC SEPARATION SYSTEM

FIELD OF THE DISCLOSURE

Embodiments of the present disclosure generally relate to recovery of hydrogen from gas streams.

BACKGROUND

Many petrochemical processes use or produce hydrogen ($H_2$), and the unreacted or produced hydrogen is generally recovered for recycle or use within the petrochemical plant. Currently, hydrogen is commonly recovered from a mixed gas stream using a pressure swing adsorption (PSA) unit or cryogenic separation unit, while the resulting tail gas is routed to the fuel gas pool.

PSA and cryogenic separations have technological limitations with the maximum amount of H2 which can be recovered. There is always some hydrogen which is lost in a tail gas stream. A major disadvantage with these configurations is loss of hydrogen to a low value stream, resulting in higher overall operating expense of the units.

SUMMARY OF THE CLAIMED EMBODIMENTS

Embodiments herein integrate gas separation membranes with PSA and/or cryogenic separations to enhance the overall recovery of hydrogen and minimize the loss of high-value hydrogen to the low value fuel gas stream. Such additional hydrogen recovery may provide a significant benefit of savings in operating expenses. This also concentrates the Carbon Dioxide (CO2) in the resulting tail gas, which makes carbon capture from the tail gas stream more efficient and economical.

In one aspect, embodiments disclosed herein relate to processes for recovering hydrogen. The processes for recovering hydrogen may include feeding a gas stream, comprising hydrogen and additional gases, to a pressure swing adsorption (PSA) system and feeding a membrane permeate stream comprising hydrogen to the PSA system. In the PSA system, a portion of the hydrogen may be separated from the additional gases to recover a hydrogen product stream and a PSA tail gas stream comprising unseparated hydrogen and the additional gases. The PSA tail gas stream may be fed to a membrane separation unit for separating hydrogen from the additional gases and to recover (i) the membrane permeate stream comprising hydrogen fed to the PSA system and (ii) a membrane tail gas stream comprising the additional gases.

In some embodiments, the processes may further include compressing the pressure swing adsorption tail gas stream upstream of the membrane separation unit. In some embodiments, the processes may further include compressing the membrane permeate stream upstream of the pressure swing adsorption system. Embodiments of processes herein may additionally include partially condensing one or both of the feed gas stream and the PSA tail gas stream.

In another aspect, embodiments disclosed herein relate to systems for recovering hydrogen. The systems may include a flow line for feeding a gas stream, comprising hydrogen and additional gases, to a pressure swing adsorption system, and a flow line for feeding a membrane permeate stream comprising hydrogen to the pressure swing adsorption system. The system also includes the pressure swing adsorption system, which may be configured for separating a portion of the hydrogen from the additional gases and to recover a hydrogen product stream and a pressure swing adsorption tail gas stream comprising unseparated hydrogen and the additional gases. A flow line may be provided for feeding the pressure swing adsorption tail gas stream to a membrane separation unit, which may be configured for separating hydrogen from the additional gases and to recover (i) the membrane permeate stream comprising hydrogen fed to the pressure swing adsorption system and (ii) a membrane tail gas stream comprising the additional gases.

In some embodiments, the system may also include a compressor for compressing the pressure swing adsorption tail gas stream upstream of the membrane separation unit. In some embodiments, the system may further include a compressor for compressing the membrane permeate stream upstream of the pressure swing adsorption system. Embodiments of systems herein may additionally include a refrigeration/separation system for partially condensing one or both of the feed gas stream and the PSA tail gas stream.

Other aspects and advantages will be apparent from the following description and the appended claims.

DETAILED DESCRIPTION

Embodiments herein are directed toward hydrogen recovery from mixed gas streams, such as process gas, waste gas, off gas, or tail gas streams from a petrochemical process, among others. The mixed gas streams fed for hydrogen recovery may include, among other components, hydrogen, carbon dioxide, carbon monoxide, hydrogen sulfide, sulfur oxides, nitrogen, oxygen, methane, ethane, ethylene, and/or propane, for example. While petrochemical streams are noted, embodiments described herein may be useful for any hydrogen containing gas stream from which it is desired to recover the hydrogen.

Current state of art utilizes stand-alone PSA units to recover $H_2$ from the process or waste gas stream. Embodiments herein integrate the PSA with a membrane system, or integrate PSA and cryogenic separations systems with membrane systems, to improve the overall $H_2$ recovery. Embodiments herein are thus different from the current state of the art in terms of hydrogen recovery parameter and configuration of the recovery block.

Embodiments herein may locate systems described herein, utilizing membranes and PSA, on gas streams to recover $H_2$ typically lost in the tail gas stream. Permeate from the membrane may be recycled back to the PSA for additional recovery of $H_2$. In some embodiments, cryogenic separation may be utilized for improving the feed quality to the membrane systems.

Figure 1:
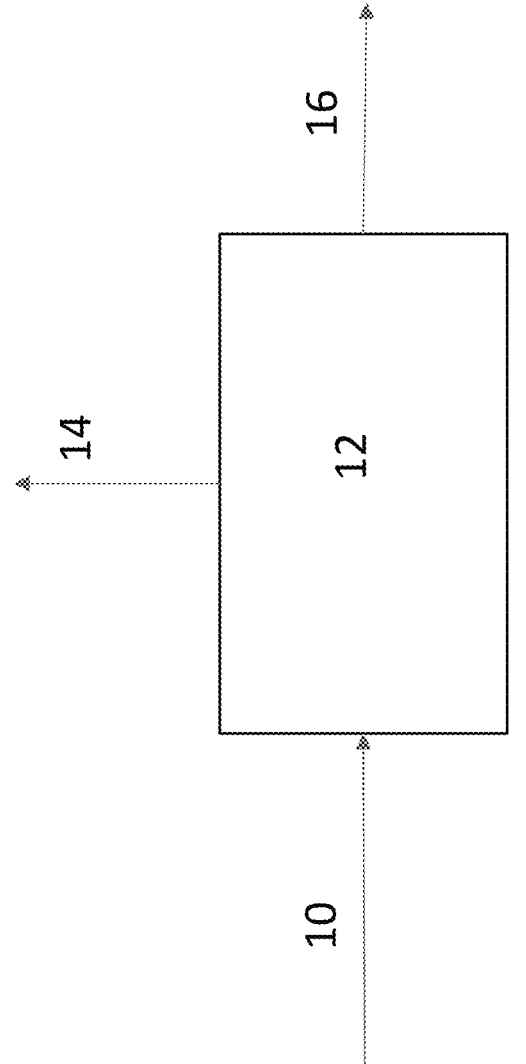
FIG. 1 is a simplified process flow diagram of a typical pressure swing adsorption system.

A simple block flow diagram of a typical prior art PSA system is shown in FIG. 1. A process gas or waste gas stream 10, which may be any gas stream targeted for $H_2$ recovery, may be fed at an appropriate pressure to PSA unit 12 for the recovery of a hydrogen product 14. Remaining gases, including any unrecovered $H_2$, is routed as tail gas stream 16, which is typically utilized as a fuel gas in the unit. As noted above, the overall recovery of hydrogen from a PSA unit results in a substantial loss of hydrogen in tail gas stream 16. PSA units can typically recover 85-90% of the hydrogen in the feed stream, while the balance of hydrogen is permanently lost in the tail gas.

Embodiments herein may enhance the recovery of $H_2$ in the tail gas stream by appropriately incorporating membrane separation within the recovery systems. A tail gas may be fed to a membrane separation unit at an appropriate pressure. If necessary, a compressor can be utilized for pressurizing the gas as required by the membrane system for the targeted $H_2$ recovery and purity. A hydrogen rich permeate stream from the membrane may then be recycled back to the PSA unit for additional recovery of $H_2$ in the final PSA product while the retentate stream may be recovered as a tail gas stream from the complex and can be utilized as a fuel gas stream, routed to carbon capture, or used for some other purpose.

Figure 2:
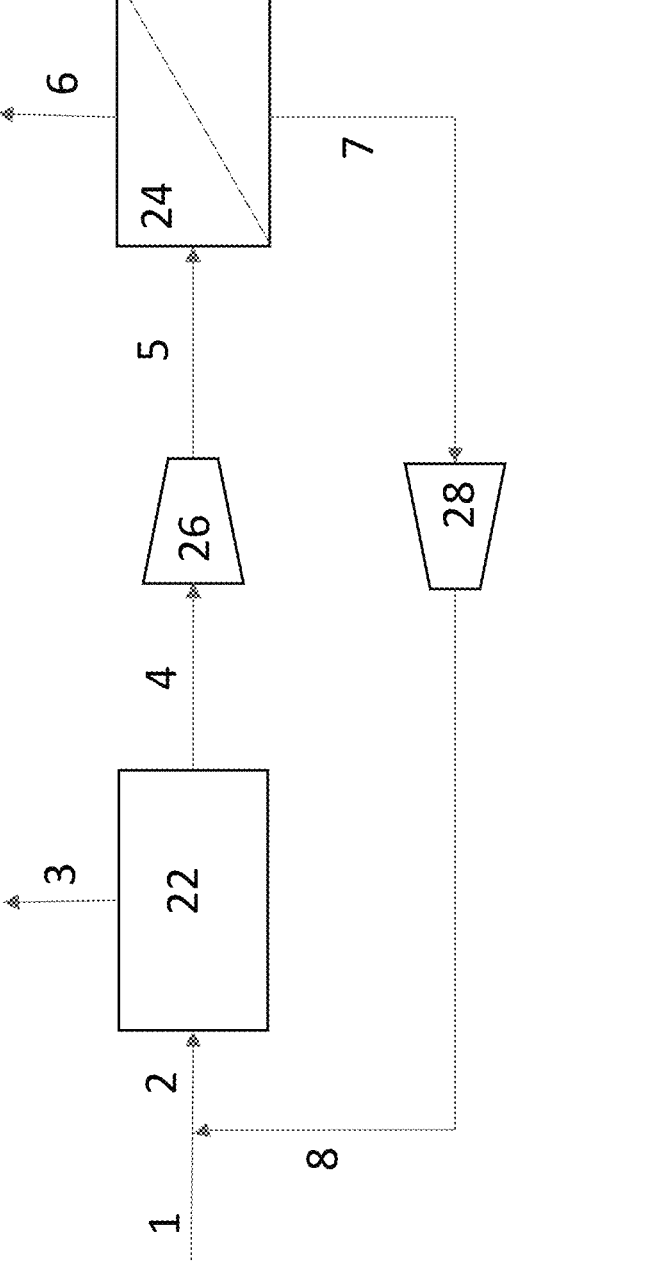
FIGS. 2 and 3 are simplified process flow diagrams of integrated systems for recovering hydrogen according to one or more embodiments disclosed herein.

Referring now to FIG. 2, a simplified process flow diagram of a system for recovering hydrogen according to embodiments herein is illustrated. A process gas or waste gas stream 1, 2, which may be any gas stream targeted for $H_2$ recovery, may be fed at an appropriate pressure, such as 25 to 35 barg, to PSA unit 22 for the recovery of a hydrogen product 3 and remaining gases 4.

The remaining gases in stream 4, including any unrecovered $H_2$, may be routed via flow stream 4 to a membrane separation system 24. If necessary, a compressor 26 may be used to increase a pressure of the remaining gases in stream 4, producing a pressurized remaining gas stream 5 that may be fed to the membrane separation system 24. For example, the remaining gases may be recovered in stream 4 at a pressure in the range of 1 to 5 barg, and the pressure of the remaining gases may be increased to a pressure in the range of 10 to 20 barg and then fed via flow stream 5 to the membrane separation system 24.

In membrane separation system 24, a membrane is used to separate the hydrogen from other gases in the remaining gas stream 4, 5. The hydrogen permeate may be recovered via flow stream 7, while the retentate stream, gases that do not permeate through the membrane, may be recovered as a tail gas stream 6. Hydrogen permeate 7 may then be recycled to the pressure swing adsorption unit 22 for recovery of the hydrogen along with feed stream 1. If necessary, a compressor 28 may be used to increase a pressure of the hydrogen in permeate stream 7, producing a pressurized permeate stream 8 that may be fed to the PSA unit 22. For example, the hydrogen rich permeate stream 7 may be recovered from the membrane separation system 24 at a pressure in the range from 1 to 2 barg and may be recycled back to the PSA unit for additional recovery of hydrogen in the final product. The retentate stream, tail gas stream 6, may be recovered at a higher pressure, such as in the range of 8 to 18 barg, and this tail gas stream from the complex may be used as a fuel gas stream, routed for carbon capture, or as some other purpose gas.

While membranes may be used that primarily recover $H_2$ in the permeate, some other gases may also be recovered along with $H_2$ in the permeate stream 7. These gases will build to a steady state concentration in the system and are eventually removed in the PSA unit and finally leave the system via tail gas stream 6.

Membrane separation system 24 may recover 70% to 90% of the hydrogen in the PSA tail gas 4, resulting in an overall hydrogen recovery from systems similar to that as depicted in FIG. 2 in the range of 96 to 99%.

In some embodiments, the process or waste gases may include condensable components, such as light hydrocarbons (methane, ethane, etc.) or other heavier gases. In some such embodiments, cryogenic separations can be utilized on the tail gas stream from the PSA unit for condensing the heavier hydrocarbons while the light ends can be processed in the membrane system. Processing higher purity $H_2$ gas streams in the membrane unit may provide better $H_2$ recovery and purity. The benefit of higher purity $H_2$ can also be utilized in operating the membrane system at a lower pressure while achieving a hydrogen recovery similar to that achieved in configurations without chillers. Cryogenic separations can also beneficially reduce the concentration of components that may impact the performance of membranes or that are incompatible with the membrane material.

Figure 3:
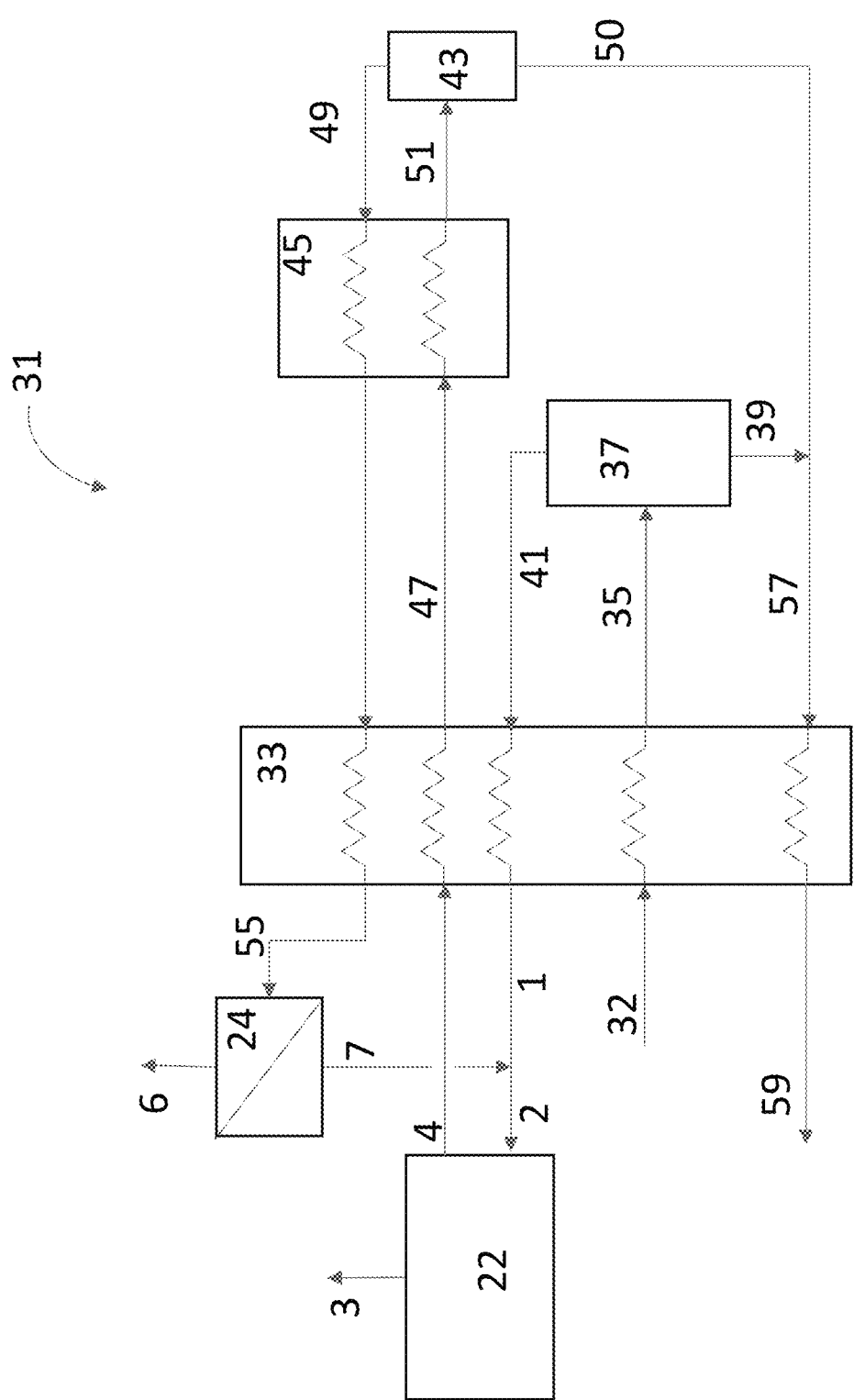

Referring now to FIG. 3, a simplified process flow diagram of a system integrating cryogenic separations, PSA, and membrane separations for recovering hydrogen according to embodiments herein is illustrated, where like numerals represent like parts.

Similar to the embodiment of FIG. 2, a process gas or waste gas stream 1, 2, which may be any gas stream targeted for $H_2$ recovery, may be fed at an appropriate pressure to PSA unit 22 for the recovery of a hydrogen product 3. Remaining gases, including any unrecovered $H_2$, may be routed via flow stream 4 to a membrane separation system 24. In membrane separation system 24, a membrane is used to separate the hydrogen from other gases in the remaining gas stream 4. The hydrogen permeate may be recovered via flow stream 7, while the retentate stream, gases that do not permeate through the membrane, may be recovered as a tail gas stream 6. Hydrogen permeate 7 may then be combined with process or waste gas stream 1 and recycled to the pressure swing adsorption unit 22 for recovery of the hydrogen via flow line 2.

To enhance the separations in each of the PSA unit 22 and the membrane separation system 24, a cryogenic separation system 31 may be used. A feed stream 32, such as a lean process gas or waste gas stream including hydrogen and condensable components, such as light hydrocarbons, may be cooled in a chiller 33, reducing a temperature of the gas stream 32 and condensing a portion of the condensable components. The resulting cooled feed stream 35 may be fed to a vapor-liquid separator 37, such as a flash drum, distillation column, or the like, to separate any condensed components from the vapors. The condensed components may be recovered as a bottoms liquid stream 39, and the uncondensed vapors may be recovered as an overhead stream 41. Overhead stream 41 may then be passed through chiller 33, producing the process gas stream or waste gas stream 1 fed to the PSA unit 22.

In addition to unrecovered hydrogen, PSA tail gas stream 4 may also contain condensable components, such as any light hydrocarbons not condensed and recovered in vapor-liquid separator 37. The PSA tail gas stream 4 may be cooled to condense at least a portion of the condensable components and fed to a second vapor-liquid separator 43, recovering a second overhead stream 49 and a second bottoms stream 50.

Cooling of the PSA tail gas stream may occur, for example, using cross-exchange in chiller 33 and/or a second chiller 45. In some embodiments, the PSA tail gas stream is initially processed through chiller 33, then fed via stream 47 to chiller 45 and cross-exchanged with the second vapor-liquid separator 43 overhead stream 49. Following cross-exchange, the chilled PSA tail gas stream 51 may be fed to the second vapor-liquid separator 43 for separation of the condensed components, recovered via flow line 50, from the uncondensed PSA tail gas components, recovered via overhead stream 49.

Following cross-exchange in chiller 45 and/or chiller 33, the overhead stream 49 (uncondensed PSA tail gas) may be fed via flow stream 55 to the membrane separation unit 24 and processed as described above. The condensed components recovered from separators 37, 43 via flow lines 39, 50 may be combined, forming a combined condensate stream 57. Combined condensate stream 57 may be expanded or otherwise used for cross-exchange in chiller 33 and recovered as a fuel gas product stream 59.

While not illustrated in FIG. 3, one or both of chillers 33, 45 may include a refrigerant feed stream to provide the desired refrigeration and cooling of the desired streams. Additionally, or alternatively, various streams may be compressed and/or expanded to provide a desired amount of refrigeration within chillers 33, 45 to result in the partial condensation.

As an example, a lean process gas stream 32 at a pressure of 20-30 barg is chilled in chiller 33 to a temperature of −37° C. to −60° C. using an appropriate refrigerant, such as propylene and/or ethylene or any combination of refrigeration provided by a refrigerant stream or process streams. The cooled feed stream 35 may then be flashed in vapor-liquid separator 37 operating at pressure of 20-30 barg. Vapor 41 from the separator is heated back to temperature in the range of 35–45° C. before it is sent via flow stream 1, 2 to PSA unit 22 for recovery of hydrogen product stream 3.

Remaining gas 4 from PSA unit 22 is further cooled in a series of chillers using methane/propylene/ethylene or any combination refrigeration to a temperature in the range of −60° C. to −98° C. For example, remaining gas 4 may be initially cooled in exchanger 33 and further cooled in exchanger 45, producing cooled remaining gas stream 51. Remaining gas stream 51 may then be flashed in vapor-liquid separator 43. Vapor from separator 43 is heated back to a temperature of 35-45° C. in the cross-exchangers/chillers 45, 33 and then sent via flow line 55 to membrane separation unit 24. Hydrogen rich permeate 7 from membrane separation unit 24 is then compressed and recycled back to PSA unit 22 for additional hydrogen recovery while retentate 6 is sent as the system tail gas to a fuel gas header.

While FIG. 3 illustrates two cross-exchangers 33, 45, and two vapor-liquid separators 37, 43, additional exchangers and separators at lower temperatures may be utilized, depending on the need to purify the H₂ in the remaining gas 4 from the PSA unit or based on the need to concentrate the H₂ in the feed 55 to the membrane separation unit 24.

The combination of PSA, cryogenic separation and membranes according to embodiments herein can provide an overall H₂ recovery in the range of 96-99%.

Integrating the cryogenic separations, such as in the embodiment of FIG. 3, may condense the heavier hydrocarbons while the light ends, including hydrogen and other non-condensable components present in the process or waste gas, can be processed in the membrane system. This may result in the processing of a feed gas stream having a higher purity in the membrane unit, which may provide better H₂ recovery and purity. The benefit of higher purity H₂ can also be utilized in operating the membrane system at lower pressure.

For all these configurations, the membrane system can be a single or multiple stage system, depending on the requirement of H₂ purity and H₂ recovery in the membrane permeate. H₂ purity and recovery across membrane impacts the overall recovery of H₂ across the membrane integrated PSA system.

Embodiments herein may also be extended to other modes of H₂ recovery processes. H₂ is also recovered via cryogenic separation where refrigerant is utilized for recovering H₂. In such embodiments, membranes can be utilized for enhanced recovery of H₂ thereby reducing the load on refrigeration system resulting in better economics of the process.

The tail gas streams 7 produced via processes as illustrated in FIGS. 2 and 3 may be used, as noted above, as a fuel gas or for some other process gas. Alternatively, the tail gas streams, containing carbon monoxide, carbon dioxide, or other carbon-containing molecules, may be fed to a carbon capture unit. The higher recovery of hydrogen resulting from processes described herein may result in a lesser quantity of tail gas to the downstream carbon capture unit. Further, the lower quantity, or near absence of hydrogen, also helps in concentrating the carbon dioxide in the feed to the carbon capture unites, resulting in a more efficient decarbonization. The lower concentration and quantity of hydrogen may also result in smaller process unit sizes required for the carbon capture units, leading to reduces capital costs for such units.

As described above, embodiments herein utilize PSA and/or cryogenic separations with membrane separations to improve hydrogen recovery from mixed gas streams. Improved hydrogen recovery will provide the benefit of savings in operating expenses of the associated plant by avoiding loss of high value hydrogen to the low value fuel gas pool. Additionally, this will also help in making the tail gas decarbonization (carbon capture from the tail gas) more efficient and smaller in capacity.

Unless defined otherwise, all technical and scientific terms used have the same meaning as commonly understood by one of ordinary skill in the art to which these systems, apparatuses, methods, processes and compositions belong.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

"Optionally" means that the subsequently described event or circumstances may or may not occur. The description includes instances where the event or circumstance occurs and instances where it does not occur.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims.

What is claimed as new and desired to be protected by Letters Patent of the United States is:

1. A process for recovering hydrogen, the process comprising:

feeding a gas stream, comprising hydrogen and additional gases, to a pressure swing adsorption system;

feeding a membrane permeate stream comprising hydrogen to the pressure swing adsorption system;

in the pressure swing adsorption system, separating a portion of the hydrogen from the additional gases to recover a hydrogen product stream and a pressure swing adsorption tail gas stream comprising unseparated hydrogen and the additional gases;

heating the pressure swing adsorption tail gas stream to a temperature in a range of 35° C. to 45° C. prior to feeding to the membrane separation unit;

feeding the pressure swing adsorption tail gas stream to a membrane separation unit;

in the membrane separation unit, separating hydrogen from the additional gases to recover (i) the membrane permeate stream comprising hydrogen fed to the pressure swing adsorption system and (ii) a membrane tail gas stream comprising the additional gases; and cooling the pressure swing adsorption tail gas stream to a temperature in the range of –60° C. to –98° C. to partially condense and flash separate the pressure swing adsorption tail gas stream to recover a PSA tail gas condensate stream and a PSA tail gas vapor stream, and feeding the PSA tail gas vapor stream as the pressure swing adsorption tail gas stream fed to the membrane separation unit.

2. The process of claim 1, further comprising compressing the pressure swing adsorption tail gas stream upstream of the membrane separation unit.

3. The process of claim 1, further comprising compressing the membrane permeate stream upstream of the pressure swing adsorption system.

4. The process of claim 1, further comprising partially condensing the gas stream, recovering a condensate stream and a vapor stream, and feeding the vapor stream as the gas stream fed to the pressure swing adsorption system.

5. The process of claim 4, wherein the partially condensing the gas stream comprises cooling the gas stream to a temperature of –37° C. to –60° C.

6. The process of claim 1, wherein the gas stream is fed to the pressure swing adsorption system at a pressure in a range from 25 to 35 barg.

7. The process of claim 1, wherein the pressure swing adsorption tail gas stream is recovered from the pressure swing adsorption system at a pressure in a range of 1 to 5 barg and is compressed to a pressure of 10 to 20 barg prior to being fed to the membrane separation unit.

8. The process of claim 1, wherein the membrane permeate stream is recovered from the membrane separation unit at a pressure in a range from 1 to 2 barg and is compressed to a pressure in a range from 25 to 35 barg for feed to the pressure swing adsorption system.

9. The process of claim 1, wherein the membrane tail gas stream is recovered at a pressure in a range of 8 to 18 barg.

10. The process of claim 1, wherein the membrane separation unit recovers 70% to 90% of the hydrogen in the PSA tail gas.

11. The process of claim 1, wherein an overall hydrogen recovery is in the range of 96 to 99%.

12. A system for recovering hydrogen, the system comprising:

a flow line for feeding a gas stream, comprising hydrogen and additional gases, to a pressure swing adsorption system;

a flow line for feeding a membrane permeate stream comprising hydrogen to the pressure swing adsorption system;

the pressure swing adsorption system, configured for separating a portion of the hydrogen from the additional gases to recover a hydrogen product stream and a pressure swing adsorption tail gas stream comprising unseparated hydrogen and the additional gases;

a flow line for feeding the pressure swing adsorption tail gas stream to a membrane separation unit;

the membrane separation unit, configured for separating hydrogen from the additional gases and to recover (i) the membrane permeate stream comprising hydrogen fed to the pressure swing adsorption system and (ii) a membrane tail gas stream comprising the additional gases;

a refrigeration/separation system configured for cooling the pressure swing adsorption tail gas stream to a temperature in the range of –60° C. to –98° C. to partially condense and flash separate the pressure swing adsorption tail gas stream to recover a PSA tail gas condensate stream and a PSA tail gas vapor stream, and configured to heat the pressure swing adsorption tail gas stream to a temperature in a range of 35° C. to 45° C. prior to feeding to the membrane separation unit;

a flow line for feeding the PSA tail gas vapor stream as the pressure swing adsorption tail gas stream fed to the membrane separation unit.

13. The system of claim 12, further comprising a compressor for compressing the pressure swing adsorption tail gas stream upstream of the membrane separation unit.

14. The system of claim 12, further comprising a compressor for compressing the membrane permeate stream upstream of the pressure swing adsorption system.

15. The system of claim 12, further comprising a refrigeration/separation system for partially condensing the gas stream, recovering a condensate stream and a vapor stream, and a flow lines for feeding the vapor stream as the gas stream fed to the pressure swing adsorption system.

16. The system of claim 12, the refrigeration/separation system comprising:

a cross-exchanger configured to exchange heat between the gas stream, the pressure swing adsorption tail gas stream, the vapor stream, the PSA tail gas vapor stream, a mixture of the condensate stream and the PSA tail gas condensate stream, and a refrigerant, producing a partially condensed gas stream;

a cross-exchanger configured to exchange heat between the pressure swing adsorption tail gas stream and the PSA tail gas vapor stream, producing a partially condensed pressure swing adsorption tail gas stream;

a vapor-liquid separator configured to receive the partially condensed gas stream, the vapor-liquid separator including a vapor outlet for recovering the vapor stream and a liquid outlet for recovering the condensate stream; and a second vapor-liquid separator configured to receive the partially condensed pressure swing adsorption tail gas stream, the second vapor-liquid separator including a vapor outlet for recovering the PSA tail gas vapor stream and a liquid outlet for recovering the PSA tail gas condensate stream.

* * * * *